Patented Oct. 24, 1950

2,527,346

UNITED STATES PATENT OFFICE 2,527,346

POLYMERIZATION OF VINYL BIPHENYL

Carl E. Barnes, Belvidere, N. J., assignor to General Aniline & Film Corporation, New York, N. Y., a corporation of Delaware No Drawing. Application December 30, 1944, Serial No. 570,755

4 Claims. (Cl. 260—93.5)

This invention relates to new polymers and to methods for their production.

I have found that polymeric products possessing excellent electrical properties may be obtained by the polymerization of vinylbiphenyl, for example, p-vinylbiphenyl having the formula:

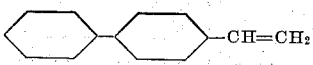

a compound obtainable by the dehydrogenation of ethyl biphenyl.

The new polymers are brittle, high molecular weight products of high softening point and refractive index, soluble in benzene or toluene, and possessing the valuable qualities of low power factor and low dielectric constant.

The polymerization of vinylbiphenyl, whether the ortho, meta or para isomers, may be carried out at subzero or at higher temperatures, the monomer being dissolved or suspended in an organic diluent in which it is at least appreciably soluble and which does not hinder the polymerization reaction, suitable inert diluents being, for example, toluene, methylene chloride, ethylene chloride, etc. Smooth reaction conditions may be obtained, for example, with amounts of the diluent in the proportion of 1 part of the monomer to about 4 volumes of the diluent.

The molecular weight of the polymers will vary with the temperature at which the polymerization is conducted, those of higher molecular weight being obtained at the lower temperatures, generally in increasing proportion as the temperature is the lower. As it is desirable to obtain polymers of the highest molecular weight, the polymerization preferably is conducted at temperatures below zero degrees centigrade, a suitable range of low temperatures being from about —10° C. to about —50° C. For the production of polymers having molecular weights in the lower range thereof, the polymerization is carried out at the higher temperatures, for example, at temperatures from about zero degrees centigrade up to about 100° C.

In polymerizing the vinylbiphenyl at the higher temperatures, the reaction may be catalyzed or promoted by the presence of small amounts, e. g., up to about 1% on the weight of the monomer, of an oxidizing type catalyst, for example, ammonium persulfate, hydrogen peroxide, an organic ozonide, e. g., diozonide of dicyclopentadiene, cyclohexene ozonide, or an organic peroxide, e. g., benzoyl peroxide, acetyl peroxide, acetyl benzoyl peroxide, etc.

In the preferred mode of preparing the polymers in which the vinylbiphenyl is polymerized at low temperatures, the reaction is promoted by the presence of a catalyst in the form of an inorganic acid-reacting condensing agent which may be, for example, boron fluoride, boron fluoride dihydrate, boron fluoride-diethyl ether addition compound, boron fluoride-dibutyl ether addition compound, aluminum chloride, stannic chloride, etc., employed in amounts of, for example, about 5% on the weight of the monomer, although greater or less quantities of the catalyst may also be employed. The purer the monomer, the smaller, generally, is the requirement of catalyst for the polymerization. Addition of the catalyst to the mixture of monomer and diluent is made in portionwise manner accompanied by agitation of the reaction mixture to avoid local overheating therein. The solid catalysts may be added to the diluent-monomer mixture in the form of a solution or suspension in a suitable inert solvent, e. g., toluene. Where it is desired to obtain polymers at particular polymerization temperatures, or it is otherwise desirable to control the temperature, heat may be withdrawn from the reaction by the application of suitable forms of refrigeration, for example, solid carbon dioxide may be added to the reaction mixture or the reaction vessel may be located in a refrigerating bath.

After the polymerization has been completed, whether accomplished in accordance with the low or the higher temperature process, the polymer is recovered by mixing a suitable nonsolvent therefor, e. g., methanol, with the reaction mixture, filtering off the polymer and drying it in a warm atmosphere to evaporate the methanol or other nonsolvent therefrom. Methanol is particularly suitable as a nonsolvent where an inorganic acid-reacting condensing agent is used as the catalyst for the polymerization since it tends to inactivate any of the acid catalyst present in the polymer.

The invention is further illustrated by the following specific examples to which, however, it is not to be limited and in which parts are by weight.

Example 1 p-Vinylbiphenyl (M. P. 119–120° C.) was dissolved in methylene chloride in the proportion of 5 parts of the monomer to 20 parts of the inert diluent. The solution was cooled to —20° C. and there was added dropwise thereto with stirring about 1.1 parts of boron fluoride-diethyl ether addition compound (100%). The polymerization was accomplished in a matter of a few seconds and the polymer precipitated by adding methanol to the reaction mixture and mixing it in a Waring blendor. The precipitated polymer was filtered off and dried. The yield was quantitative. The refractive index of the polymer is about 1.62.

A film cast from a solution of the polymer in benzene was found to have a dielectric constant of 4.0 and a power factor of .04%.

*Example 2*

A solution of the p-vinylbiphenyl was made up as described in Example 1, employing ethylene chloride as the diluent in place of the methylene chloride. To the solution about 0.6% on the monomer of benzoyl peroxide was added thereto with stirring and the mixture heated at 70° C. for several days. The polymer was precipitated with methanol as in Example 1, filtered off and dried. The yield was almost quantitative.

I claim:

1. A process of polymerizing p-vinylbiphenyl which comprises contacting it at a polymerizing temperature of about −10° C. and below in the presence of a liquid organic diluent with a catalyst for the polymerization which is a boron fluoride compound.

2. A process of polymerizing p-vinylbiphenyl which comprises contacting it at a polymerizing temperature of about −10° C. and below in the presence of a liquid organic diluent with a catalyst for the polymerization which is a boron fluoride-dialkyether addition compound.

3. A process of polymerizing p-vinylbiphenyl which comprises contacting it at a polymerizing temperature of about −10° C. and below in the presence of a liquid organic diluent with a catalyst for the polymerization which is boron fluoride-diethylether addition compound.

4. The process as defined in claim 3, wherein the liquid organic diluent is methylene chloride.

CARL E. BARNES.

REFERENCES CITED

The following references are of record in the file of this patent:

UNITED STATES PATENTS

| Number | Name | Date |
|---|---|---|
| 2,297,723 | Soday | Oct. 6, 1942 |
| 2,302,464 | Palmer et al. | Nov. 17, 1942 |
| 2,383,922 | Soday | Aug. 28, 1945 |
| 2,414,803 | D'Alelio | Jan. 28, 1947 |
| 2,471,785 | Seymour et al. | May 31, 1949 |

FOREIGN PATENTS

| Number | Country | Date |
|---|---|---|
| 115,688 | Australia | Aug. 20, 1942 |
| 132,042 | Austria | Sept. 15, 1932 |
| 204,859 | Switzerland | Aug. 16, 1939 |